(12) United States Patent
Bostick et al.

(10) Patent No.: US 9,471,954 B2
(45) Date of Patent: Oct. 18, 2016

(54) VIDEO SEQUENCE ASSEMBLY

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/658,497

(22) Filed: Mar. 16, 2015

(65) Prior Publication Data

US 2016/0275641 A1 Sep. 22, 2016

(51) Int. Cl.
G09G 5/00 (2006.01)
G06T 1/20 (2006.01)
H04N 5/44 (2011.01)
H04N 5/262 (2006.01)
H04N 5/225 (2006.01)

(52) U.S. Cl.
CPC ............... G06T 1/20 (2013.01); H04N 5/225 (2013.01); H04N 5/262 (2013.01); H04N 5/44 (2013.01)

(58) Field of Classification Search
None
See application file for complete search history.

(56) References Cited

U.S. PATENT DOCUMENTS

| | | | |
|---|---|---|---|
| 5,157,737 A * | 10/1992 | Sklarew | G06F 3/033 345/173 |
| 7,403,224 B2 | 7/2008 | Fuller et al. | |
| 7,583,275 B2 * | 9/2009 | Neumann | G06T 17/00 345/419 |
| 7,991,271 B2 | 8/2011 | Candelore | |

(Continued)

OTHER PUBLICATIONS

Disclosed Anonymously, "Automated Video Creation Using Audio and Video Components Extracted From Videos Based on a Received Script for the Video", An IP.com Prior Art Database Technical Disclosure, IP.com No. 000236565, May 2, 2014, pp. 1-52.

(Continued)

*Primary Examiner* — David H Chu
(74) *Attorney, Agent, or Firm* — Steven F. McDaniel

(57) ABSTRACT

A method includes receiving, by one or more processors, metadata corresponding to a scene, the metadata comprising a current location and orientation of a scene capture device used to capture the metadata, receiving, by the one or more processors, a required recording quality indication from a user, determining, by the one or more processors, according to the metadata, a stored video sequence corresponding to the scene that meets the required recording quality indication and corresponds to the current location and orientation, and determining, by the one or more processors, according to the metadata, a stored video sequence corresponding to the scene, and assembling, by the one or more processors, an output video sequence for the scene that incorporates at least a portion of the stored video sequence. A corresponding computer program product and computer system are also disclosed herein.

11 Claims, 3 Drawing Sheets

(56) References Cited

U.S. PATENT DOCUMENTS

| | | | |
|---|---|---|---|
| 2005/0033760 A1 | 2/2005 | Fuller et al. | |
| 2006/0221246 A1* | 10/2006 | Yoo | H04N 5/46 348/581 |
| 2007/0244925 A1* | 10/2007 | Albouze | G06F 17/30265 |
| 2008/0291217 A1* | 11/2008 | Vincent | G06T 17/05 345/629 |
| 2009/0002394 A1* | 1/2009 | Chen | G06T 3/4038 345/632 |
| 2010/0175099 A1* | 7/2010 | Kim | H04N 21/23431 725/110 |
| 2011/0141141 A1* | 6/2011 | Kankainen | G01C 21/3647 345/632 |
| 2012/0092528 A1* | 4/2012 | Jung | G06T 11/60 348/239 |
| 2012/0224070 A1* | 9/2012 | Burroff | H04N 5/23219 348/207.1 |
| 2013/0002890 A1 | 1/2013 | Sauerwein, Jr. et al. | |
| 2013/0336633 A1 | 12/2013 | Deever | |
| 2014/0085450 A1 | 3/2014 | Rohde | |
| 2014/0253703 A1 | 9/2014 | King | |
| 2015/0066931 A1* | 3/2015 | Nagano | G06F 17/30241 707/737 |
| 2015/0365450 A1* | 12/2015 | Gaunt | H04L 65/4084 709/231 |

OTHER PUBLICATIONS

IBM et al., "A Method to Exploit Metadata of Unstructured Information for Search and Classification", An IP.com Prior Art Database Technical Disclosure, IP.com No. 000144129, Dec. 19, 2006, pp. 1-3.

"Apps for Videographers: iPad/iPhone Apps AppList", provided by inventor in Main Idea dated Nov. 4, 2014, <http://appadvice.com/applists/show/apps-for-videographers>.

"Examing video file metadata", WebCase WebLog, provided by inventor in Prior Art section of Main Idea dated Nov. 4, 2013, <http://veresoftware.com/blog/?p=364>.

* cited by examiner

VIDEO SEQUENCE ASSEMBLY

BACKGROUND OF THE INVENTION

The present invention relates generally to video capture, storage and playback, and more particularly to reducing memory requirements when capturing, storing, and playing video sequences.

Scene capture devices such as video recorders, cameras, and cell phones have become increasingly more affordable and ubiquitous. Consequently, the amount of video data that is captured, stored, and viewed continues to increase. Reducing the data storage requirements associated with capturing, storing, and viewing video sequences would be an advancement in the art.

SUMMARY

A method includes receiving, by one or more processors, metadata corresponding to a scene, the metadata comprising a current location and orientation of a scene capture device used to capture the metadata, receiving, by the one or more processors, a required recording quality indication from a user, determining, by the one or more processors, according to the metadata, a stored video sequence corresponding to the scene that meets the required recording quality indication and corresponds to the current location and orientation, and determining, by the one or more processors, according to the metadata, a stored video sequence corresponding to the scene, and assembling, by the one or more processors, an output video sequence for the scene that incorporates at least a portion of the stored video sequence.

DETAILED DESCRIPTION

Figure 1:
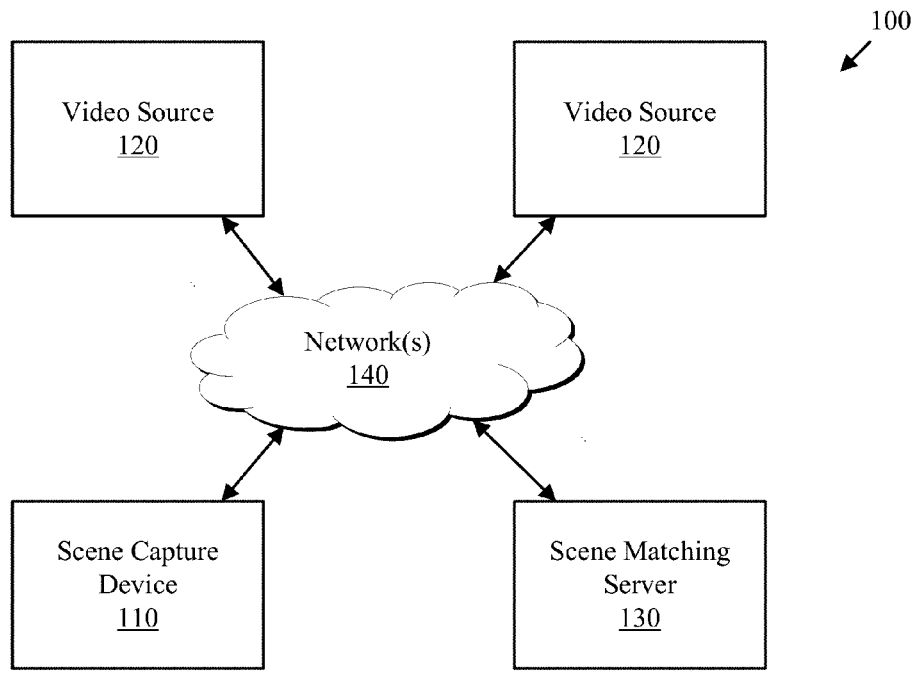
FIG. 1 is a block diagram of one embodiment of a video assembly system in accordance with the present invention.

The embodiments disclosed herein reduce the storage requirements associated with capturing, storing, and viewing video sequences.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Video is a powerful media used in business, entertainment and our personal lives. Increasingly people have digital devices that are capable of capturing video at their fingertips. With that said, even the more advanced devices have a significant limitation on how much video can be captured and stored on the device which is measured in minutes or hours depending on the quality of the video, device capability and storage.

When traveling to historic sites, natural wonders, or other popular destinations where others also visit to capture video and photos, a user may likely take interest in locations and objects that are similar to the interests of others. There are vast quantities of videos and photos within the publicly accessible sites (i.e., repositories) such as YOUTUBE™, FACEBOOK®, PICASA™, etc. [Note: the terms "YOUTUBE", "FACEBOOK®", and "PICASA™" may be subject to trademark rights in various jurisdictions throughout the world and is used here only in reference to the products or services properly denominated by the marks to the extent that such trademark rights may exist.] In some cases, a user would either have to buy a lot of extra storage or make decisions on things they want to video or take photos due to limitations on how much storage is available.

For example, when traveling to Niagara Falls in Canada or in the USA there may be a range of video recordings the user wants to capture. Examples include nature shots of the falls, gorge, rapids, botanical gardens, etc. This type of video is somewhat generic but would take up a lot of space. There are other types of video that might include the person's family members with Niagara Falls in the background that is unique.

It is desired to reduce memory storage requirements when capturing video and photos, but further to produce good quality video that captures scenes of key locations, as well as the users themselves within the video or photos. For example, a cloud computing environment that offers remote data storage may be subject to significant pricing pressures in the competitive marketplace. Currently available video and image data files consume large amounts of data storage despite the use of compressed encodings such as MPEG-2, MPEG-4, H.261 and H.263. Consequently, a cloud center that offers users the ability to store video and image data files with a reduced storage footprint, while maintaining sufficient quality, would achieve a significant competitive advantage. The embodiments disclosed herein address these issues.

For example, FIG. 1 is a block diagram of one embodiment of a video assembly system 100 in accordance with the present invention. As depicted, the video assembly system 100 includes a scene capture device 110, one or more video sources 120, a scene matching server 130, and one or more interconnection networks 140. The video assembly system 100 enables efficient representation of video captured by the scene capture device 110.

The scene capture device 110 captures metadata for a scene. In some embodiments, the scene capture device is also capable of capturing an input video sequence for the scene. The input video sequence may comprise a sequence of one or more images that correspond to the scene and the metadata may provide information about the scene. The scene capture device 110 may be a video recorder, camera, tablet, or cell phone operated by a user at a particular location and with a selected orientation.

In some embodiments, the user (not shown) selects whether both metadata and the input video sequence is captured for the scene or whether just metadata is captured for the scene. The metadata may include information fields such as the location(s) and orientation(s) of the scene capture device and the date, time range, and weather conditions for the captured scene. The metadata may also include information fields about the stored video sequence such as information about the frame rate, image resolution, data encoding format, and the like.

The video sources 120 provide stored video sequences to the system 100. The video sources 120 may be publicly accessible repositories (both public domain and proprietary sources) of stored video sequences that are annotated with metadata. The metadata may describe information about the scene where each stored video sequence was captured.

The metadata for a stored video sequence may or may not contain the same information fields as the metadata for the scene. In one embodiment, information fields that are not in common are ignored. In another embodiment, the names of information fields that are not in common are compared for similarity and those information fields with similar names are given partial weighting for comparison purposes (discussed below). In some embodiments, some or all of the metadata for a stored video sequence is extracted from the stored video sequence via image processing. For example, lighting and weather condition information (e.g. raining, cloudy, partly cloudy, sunny) may be extracted from the stored video sequence by image processing.

The scene matching server 130 may receive the metadata corresponding to the scene and optionally the video sequence provided by the scene capture device 110. In response to receiving the metadata, the scene matching server 130 may determine, according to the metadata, one or more stored video sequences that correspond to the scene. In some embodiments, determining a stored video sequence comprises comparing metadata for the scene to metadata for various stored video sequences. For example, the scene matching server 130 may use location and orientation metadata to determine one or more STREET VIEW™ video sequences that match the scene. [Note: the term STREET VIEW™ may be subject to trademark rights in various jurisdictions throughout the world and is used here only in reference to the products or services properly denominated by the marks to the extent that such trademark rights may exist.]

In some embodiments, the stored video sequence having metadata with the best correlation or similarity to the metadata for the scene is selected by the scene matching server 130. For example, the server 130 may use a string similarity measure such as a Levenshtein distance, a Hamming distance, or a Jaro-Windler distance to determine the similarity between the metadata for the scene and the metadata for each stored video sequence. In one embodiment, a min hashing algorithm is used to determine a matching stored video sequence. The metadata correlation or similarity conducted by the scene matching server 130 may be weighted. For example, location and orientation information within the metadata may be weighted higher than date or time range information.

In addition to metadata, the scene matching server 130 may also use objective and subjective quality metrics to determine a matching stored video sequence. Examples of objective quality metrics include image resolution and signal-to-noise ratio. Examples of subjective quality metrics include user rankings, ratings, or other forms of user or social media sentiment.

The scene matching server 130 may elect to save an input video sequence for use as a stored video sequence. For example, a tourist may be the first person to capture a scene for a new attraction. In such a situation, the scene matching server 130 may elect to save the input video sequence, and the associated metadata, as a stored video sequence on a video source 120. In some embodiments, the scene matching server 130 is also a video source 120 and the input video sequence is stored locally for subsequent use.

The interconnection networks 140 enable communication between the scene capture device 110, the video sources 120 and the scene matching server 130. The interconnection networks 110 may include wireless, wired, and optical components or sub-networks. In some embodiments, the scene capture device 110 operates in an automatic mode and records an input video sequence only if the scene matching server 130 indicates that a stored video sequence of sufficient quality is not available. In other embodiments, the scene capture device 110 records the input video sequence and enables the user to discard the input video sequence, or a portion thereof. For example, upon review the user may determine that the stored video sequence is of sufficient quality and that the input video sequence may be discarded. In certain embodiments, the scene matcher server 130 is embedded in the scene capture device 110.

Figure 2:
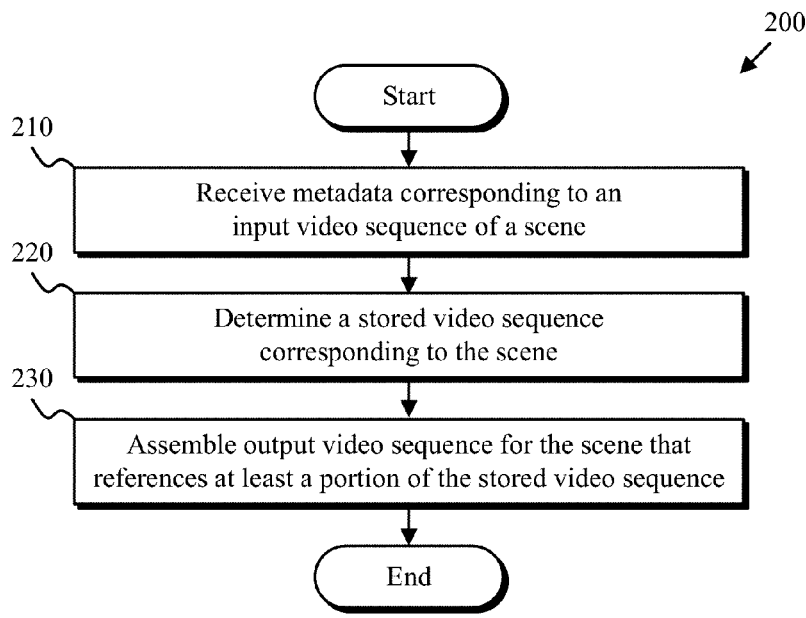
FIG. 2 is a flowchart of one embodiment of a video assembly method in accordance with the present invention.

FIG. 2 is a flowchart of one embodiment of a video assembly method 200 in accordance with the present invention. As depicted, the video assembly method 200 includes receiving (210) metadata corresponding to an input video sequence of a scene, determining (220) a stored video sequence corresponding to the scene, and assembling (230) output video sequence for the scene corresponding to a scene. The video assembly method 200 may be conducted by one or more elements of the video assembly system 100 such as the scene capture device 110 or the scene matching server 130.

Receiving (210) metadata corresponding to a scene may include receiving metadata provided by a scene capture device 110. The metadata may describe attributes of the scene such as location, user description, orientation (e.g. azimuthal and elevational angles), date and time, weather conditions, lighting conditions, figure information, and the like. Various sensors and devices such as GPS sensors, accelerometers, humidity sensors, light sensors, range finders, tilt sensors, and clocks that are embedded in the scene capture device 110 may enable the scene capture device to provide the metadata. The metadata may also describe attributes of the scene capture device such as model number, image resolution, frame rate, aperture, light sensitivity (e.g., ISO setting), location (e.g., GPS coordinates), velocity, and the like.

Determining (220) a stored video sequence corresponding to the scene may include matching the metadata for the scene with metadata for various stored video sequences and determining therefrom if a stored video sequence may be similar enough to the input video sequence to use in place of some, or all, of the input video sequence. Some metadata, such as location and orientation may be weighted higher than other metadata for comparison purposes.

In addition to matching provided metadata, image processing may be used to compare the input video sequence with one or more stored video sequences. For example, images from a stored video sequence may be correlated with images from the input video sequence to come up with a correlation score that can be used in determining the stored video sequence. In some embodiments, metadata such as lighting information is extracted from the input video sequence or the stored video sequences by image processing. The extracted metadata and the provided metadata may be used when matching the scene to a stored video sequence.

Assembling (230) an output video sequence for the scene may include using the selected stored video sequence and the input video sequence (if provided) to assemble an output video sequence for the scene that references (e.g., via a URL or filename and time range) at least a portion of the stored video sequence. Using a portion of the stored video sequence enables representing the input video sequence with less data in that the output video sequence may reference the stored video sequence and avoid the overhead of locally storing the data for the portions of the stored video sequence that are reused in the output video sequence.

Assembling (230) an output video sequence may involve using or referencing segments from multiple stored video sequences. For example, in situations where a user is moving, the scene matching server 130 may convert the travel path of the user to multiple scenes and attempt to find a matching stored video sequence for each scene. Consequently, the output video sequence may be a composite of multiple stored video sequences.

A scene may include one or more objects, referred to herein as 'figures', that are not permanently present in the scene, or are selected as a figure by the user. Examples of a figure include a person, an animal, a vehicle, or a user selected object such as a landmark. In some embodiments, the user selects an animate or inanimate object as a figure via a user interface on the scene capture device 110. For example, the scene capture device may enable a user to point somewhere on the body of an object on a screen image of the scene displayed to a user. The scene capture device or the scene matching server may (immediately or subsequently) determine the edges of the object via image processing. In some embodiments, the user may be prompted to provide an identifier such as an alphanumeric sequence (e.g., a name) for a figure. The identifier may be incorporated into the metadata for the scene (e.g., a scene title).

In some embodiments, figures are automatically detected via motion detection. Motion detection may be accomplished by one or more sensors (e.g., optical, infrared, microwave, or acoustic sensor) incorporated into the scene capture device 110. In other embodiments, motion detection is conducted by image processing of the input video sequence. For example, motion detection of the figures may be accomplished by the scene capture device 110 when the scene is captured or subsequently by the scene matching server 130.

In certain embodiments, image processing may be used to compare identified figures with a database of known figures. For example, the scene capture device 110 or the scene matching server 130 may host or have access to a database that stores feature information and identification information (e.g., name and/or description) for various known objects such as individuals, buildings, and landmarks. The feature information and associated identification information may enable identification of figures within a scene. The identification information for identified figures may be incorporated into the metadata for the scene. In some embodiments, at least a portion of the known figures are associated with one or more specific users.

In some embodiments, the portion of the input video sequence corresponding to one or more figures within a scene is encoded as a sequence of (partial) video frames while the portion of the input video sequence corresponding to the stored video sequence (e.g., the permanent portions of the scene) is represented as one or more references to the stored video sequence. For example, the portion of the input video sequence corresponding to the stored video sequence may be represented as a URL reference (to the stored video sequence) and a time range within the metadata of the output video sequence.

In some situations, the stored video sequence may completely represent the original scene and the output video sequence remains free of image data until the output video sequence is played. In such situations, the URL reference may be used to retrieve the stored video sequence and provide the appropriate image data for playback. In certain embodiments, the user may review playback of the stored video sequence (with or without figures overlaid thereon) and determine that the stored video sequence is of sufficient quality to represent the scene and that the original input video sequence may be discarded.

In some embodiments, image processing may be conducted on the stored video sequence in order to provide better matching to the captured scene. For example, image processing may be used to change the lighting, weather conditions, location, orientation, or zoom level for the scene to better match the captured scene.

In some embodiments, the assembling operation 230 may occur immediately after an input video sequence is captured, or deferred until a convenient time. For example, the assembling operation 230 may not occur until a request to view the output video sequence is received. Deferring until a request is received may eliminate unnecessary processing and reduce the storage footprint of the video. In some embodiments, the assembling operation 230 may be conducted more than once. For example, a stored video sequence that better matches the scene may become available and the assembling operation 230 may be conducted again using the stored video sequence that better matches the scene.

Figure 3:
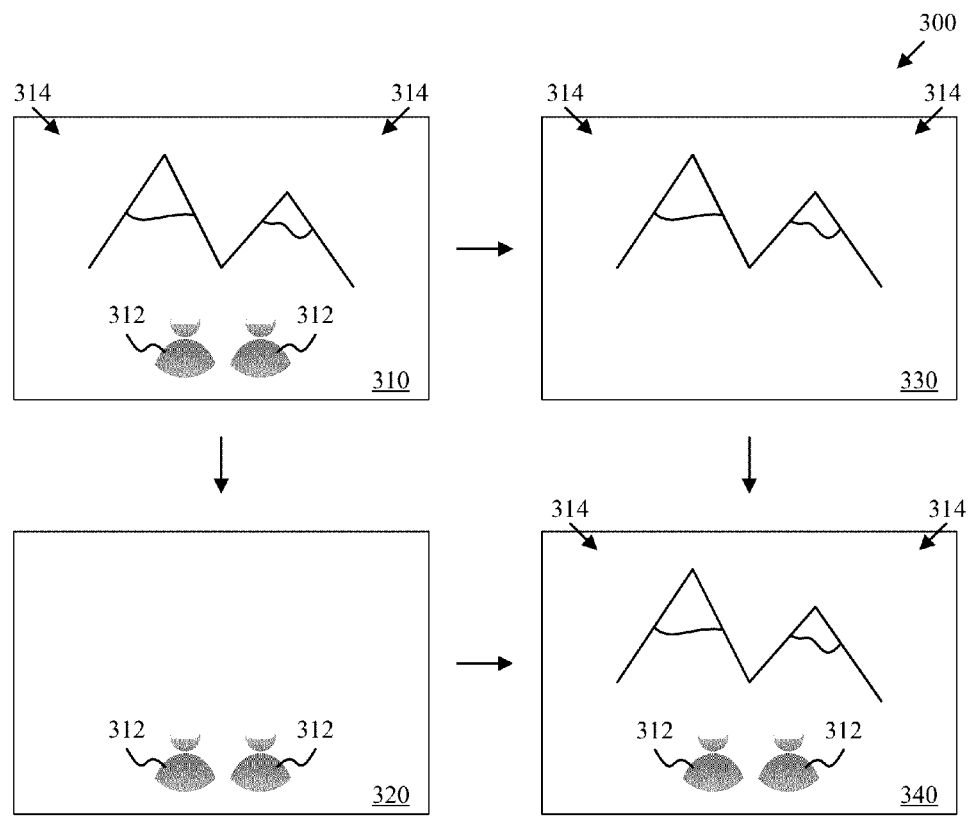
FIG. 3 is a pictorial diagram depicting one example of video assembly dataflow in accordance with the present invention.

FIG. 3 is a pictorial diagram depicting one example of video assembly dataflow 300 in accordance with the present invention. As depicted, an input video sequence 310 (represented by a still drawing) may include one or more figures 312 as well as a background 314 corresponding to a scene. In the depicted example, the figures 312 are individuals in the foreground of the scene. In some embodiments, the figures 312 are extracted from the input video sequence to provide a figure video sequence 320. In other embodiments, the input video sequence only includes the figures 312 (i.e., without the background 314) and the input video sequence 310 may be used as the figure video sequence 320.

A stored video sequence 330 may be found that matches the background 314. For example, a stored video sequence 330 may be found by comparing metadata from the input video sequence 310 with metadata from various archived videos available from the video sources 120 (shown in FIG. 1). Alternately, or in addition, the background 314 may be compared with various archived videos using video processing techniques known to those of skill in the art. The archived videos may be stripped of any figures to facilitate usage as the background 314.

Assembly of an output video sequence 340 may be accomplished, either immediately, or on demand, by overlaying the figure video sequence 320 onto (at least a portion of) the stored video sequence 330. Consequently, the output video sequence 340 may incorporate the stored video sequence 330 by including some or all of the stored video sequence 330. Alternately, an output video sequence 340 may incorporate the stored video sequence 330 by referencing some or all of the stored video sequence 330. In such a scenario, the stored video sequence 330 may be retrieved on demand upon playback of the output video sequence 340 and the figure video sequence 320 may be overlaid thereon to provide a complete scene to one or more viewers.

Figure 4:
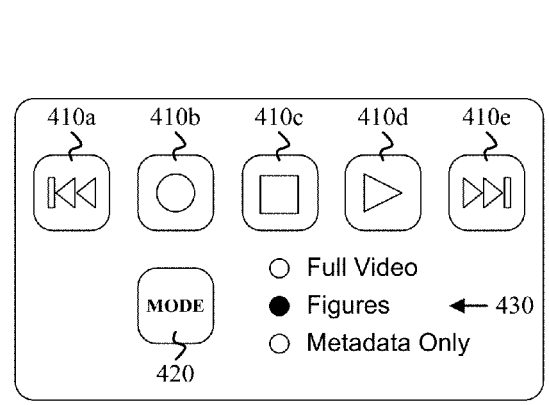
FIG. 4 is a user interface diagram depicting one example of a capture device interface in accordance with the present invention.

FIG. 4 is a user interface diagram depicting one example of a capture device interface 400 in accordance with the present invention. As depicted, the capture device interface 400 include a set of media access controls 410, a mode button 420, and a mode indicator 430. The capture device interface 400 enables a user to select a capture mode for a scene capture device 110 such as a video recorder, camera, or cell phone.

The depicted set of media access controls 410 are conventional and include a rewind button 410a, a record button 410b, a stop button 410c, a play button 410d, and a fast forward button 410e. The mode button 420 enables a user to change the video capture mode of the scene capture device 110. The mode indicator 430 displays the selected mode. In the depicted embodiment, the modes include a 'full video' mode, a 'figures' mode, and a 'metadata only' mode. In another embodiment, an 'automatic' mode uses the mode that provides the smallest storage space while meeting selected quality requirements. In some embodiments, the user is able to indicate a required quality indication (i.e., level) via a menu or the like (not shown).

By selecting the 'figures' mode, only the portion of a scene that corresponds to figures (i.e., a figure video sequence 320) is captured by the scene capture device 110. However, metadata that describes the scene may be captured and stored with the captured figures. In some embodiments, the scene capture device enables the user to select, verify, or adjust the regions within the video viewing frame that are captured with the 'figures' mode.

Alternately, the capture device interface 400 enables a user to elect to operate the scene capture device 110 in the 'metadata only' mode so that only metadata is captured by the scene capture device 110. For example, a user may elect to use 'metadata only' mode when doing sightseeing or the like. One of skill in the art will appreciate that the described modes can significantly decrease the storage requirements of captured video and that an output video sequence that recreates the captured scene may be generated using the methods and systems described herein.

In some embodiments, an application that provides various video capture modes and/or interfaces to a scene matching server may be installed on a scene capture device. If the scene capture device is within range of wireless connectivity (e.g., WIFI, 3G, etc.), when focusing on a scene, the scene capture device may communicate in real-time to the scene matching server to check if video is available for the scene. This can be used as a verification step and the user can get a ranking of video to determine if they want to proceed with capturing full video, or with capturing just a portion of the scene corresponding to one or more figures, or with capturing only metadata. This enables the user to know that capturing only metadata is a safe option. It could also help with allowing the user to know that stored video sequences do exist that can be used for this purpose, but said videos are zoomed in a certain percent closer, and thus the photographer can make adjustments accordingly.

The metadata may be recorded with each video mode and may include geo-coordinates of a travel path along with date, time, weather information, speed of travel, etc. The metadata for a scene may be any data about the scene that is being viewed through the lens of the scene capture device. This includes (but is not limited to) lens metadata (e.g., aperture, frame rate, and ISO), user provided metadata (e.g., titles, owner, category, plus any user-added or defined fields), time/space metadata (gps and/or other geo-coordinates, date, and time or time range). The use of all this metadata may be associated with a video sequence. For example, if a first user shoots a video of the eiffel tower from a given location, and a second user comes by the next day and shoots the same video, the metadata associated with the two users will match, and the system may reference video captured by the first user (for either the entire or partial sequences) in the captured video of the second user. The associated captured metadata as well as references to video sequences shot by the first user may be stored on the scene capture device in a file format that supports metadata along with any captured video sequences.

The embodiments disclosed herein enable dynamic assembly of video for a given location from captured metadata. Metadata similarity analysis may be used to correlate and determine the best available video, including those from public domain sources, to construct the desired output video sequence. Various quality levels of video may be captured including full video, figures and metadata, or just metadata for ultimate storage conservation. The metadata for a scene may be compared to metadata for stored video sequences to identify the best available video for assembling the output video sequence, and in cases of figures, overlay video segments of the figures over the stored video sequence sourced from the public accessible source.

In some embodiments, a remote server is used to process the metadata using metadata similarity analysis to assemble the output video sequence. In certain embodiments, users may subscribe to services of a website and download a client application to their digital camera or mobile device. Users may have defined preferences for video assembly (e.g., specific sites within public domain to source video, specific themes, rankings, other user sentiment).

When the user is in range of networking capability they can upload the metadata to the scene matching server or another selected device. Given that the amount of data needed to upload just metadata is relatively small in comparison to a video sequence the upload of metadata will be performed relatively quickly.

The scene matching server may receive the uploaded metadata and begin a similarity analysis process. User preferences or settings determined at time of upload may guide the similarity analysis process. In some embodiments, the user is presented with various options for assembly of an output video sequence. For example, one option would provide the user with a STREET VIEW™ navigation of the location based on the metadata. The STREET VIEW™ in this case would also take into account the location, date, time, weather, etc. for optimal display that is representative to users experience.

The embodiments herein enable dynamic assembly of an output video sequence by using similarity analysis to correlate metadata for the scene with metadata for stored video sequences that are available from publicly accessible video sources. Figures from the scene may or may not be overlaid onto the stored video sequences.

A verification capability may be provided such that the scene capture device could receive acknowledgement that the location and object to be captured exists in known sources and is of good quality measured by ranking and other forms of social media sentiment. The verification capability can be used to automatically flip the camera from collecting metadata only to full video mode, or vice versa, depending on the ability of the scene matching server to provide a viable stored video sequence.

The functionality disclosed herein may be built into a scene capture device and/or provided as a service to users of conventional scene capture devices.

Figure 5:
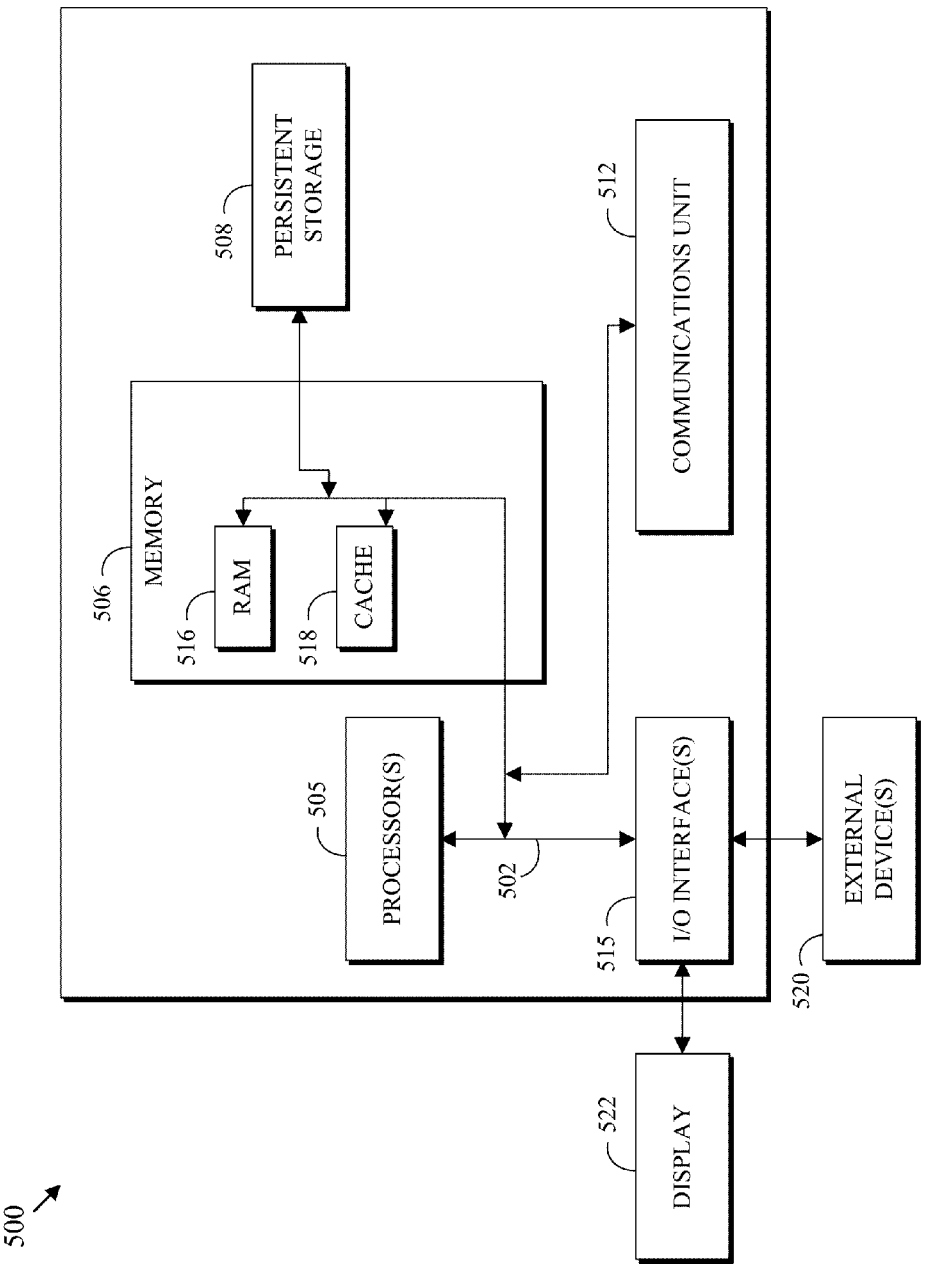
FIG. 5 is a block diagram depicting one example of a computing apparatus (i.e., computer) suitable for executing the methods disclosed herein.

FIG. 5 is a block diagram depicting components of a computer 500 suitable for executing the methods disclosed herein. The computer 500 may be one embodiment of the scene matching server 130 and (at least portions of) the scene capture device 110 depicted in FIG. 1. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method comprising:
   receiving, by one or more processors, a current location and orientation of a scene capture device metadata corresponding to a scene, the metadata comprising a current location and orientation of a scene capture device used to capture the metadata;
   receiving, by the one or more processors, an indication from a user to capture only metadata for the scene;
   determining, by the one or more processors, according to the metadata, from a publicly accessible repository of video sequences a stored video sequence that corresponds to the current location and orientation; and
   assembling, by the one or more processors, an output video sequence of the scene that incorporates at least a portion of the stored video sequence without recording an input video sequence for the scene.

2. The method of claim 1, wherein determining the stored video sequence comprises comparing the metadata to metadata of the stored video sequence.

3. The method of claim 1, wherein the metadata comprises weather information for the scene when the scene was captured.

4. The method of claim 1, wherein the metadata comprises at least one of date information for the scene, time information for the scene, weather information for the scene when the scene was captured, velocity information for the scene capture device when the scene was captured, image resolution information for an input video sequence, frame rate information for the input video sequence, lighting conditions information for the scene when the scene was captured, and model information for the scene capture device.

5. The method of claim 1, wherein the metadata comprises identification information for at least one object.

6. The method of claim 1, further comprising reassembling the output video sequence and referencing at least a portion of another stored video sequence.

7. The method of claim 1, wherein assembling the output video sequence is deferred until playback.

8. A computer program product for assembling a video, the computer program product comprising:
one or more computer readable storage media and program instructions stored on the one or more computer readable storage media, the program instructions comprising instructions to:
receive metadata corresponding to a scene, the metadata comprising a current location and orientation of a scene capture device used to capture the metadata;
receive an indication from a user to capture only metadata for the scene;
determine, by the one or more processors, according to the metadata, a stored video sequence that corresponds to the current location and orientation; and
assemble an output video sequence of the scene that incorporates at least a portion of the stored video sequence without recording an input video sequence for the scene.

9. The computer program product of claim 8, wherein the instructions to determine the stored video sequence comprises instructions to compare the metadata to metadata for the stored video sequence.

10. A method comprising:
determining, by one or more processors, a current location and orientation of a scene capture device;
receiving, by the one or more processors, a required recording quality indication from a user;
determining, by the one or more processors, according to the current location and orientation of the scene capture device, whether a stored video sequence that meets the required recording quality indication and corresponds to the current location and orientation is available from an accessible source; and
instructing, by the one or more processors, the scene capture device to record only metadata in response to determining that a stored video sequence that meets the required recording quality indication and corresponds to the current location and orientation is available.

11. The method of claim 10, further comprising instructing, by the one or more processors, the scene capture device to record an input video sequence in response to determining that a stored video sequence that meets the required recording quality indication and corresponds to the current location and orientation is not available from a publicly accessible source.

* * * * *